United States Patent [19]

Molin

[11] 4,093,038

[45] June 6, 1978

[54] SPRING BRAKE ASSEMBLY

[75] Inventor: Neil Leroy Molin, New Brighton, Minn.

[73] Assignee: Danfoss A/S, Nordborg, Denmark

[21] Appl. No.: 741,243

[22] Filed: Nov. 12, 1976

[51] Int. Cl.² .................................................. B60T 7/00
[52] U.S. Cl. ................................. 180/82 R; 55/385 B; 55/419; 92/64; 92/78
[58] Field of Search ............. 92/63, 64, 78, 79, 130 A; 180/82 R; 280/762; 55/419, 514522, DIG. 13, 385 B

[56] References Cited

U.S. PATENT DOCUMENTS

| 2,289,043 | 7/1942 | Rockwell | 92/78 |
| 2,675,093 | 4/1954 | McCall | 55/419 |
| 2,708,920 | 5/1955 | Pasturczak | 55/385 B |
| 3,494,111 | 2/1970 | Hathaway | 55/419 |
| 3,641,744 | 2/1972 | Culbert | 55/385 B |
| 3,896,706 | 7/1975 | Newstead | 92/63 |
| 3,906,798 | 9/1975 | Dray | 55/419 |
| 3,977,308 | 8/1976 | Swander, Jr. | 92/63 |
| 4,031,814 | 6/1977 | Lukens | 92/63 |

FOREIGN PATENT DOCUMENTS 2,431,131   1/1975   Germany .................................. 92/63

*Primary Examiner*—Martin P. Schwadron
*Assistant Examiner*—Abraham Hershkovitz

[57] ABSTRACT

The invention relates to a spring brake assembly of the compressed air type for truck tractor types of vehicles. The brake actuators of the assembly each includes a heavy coil type emergency spring which is held in a compressed state on the back side of a diaphragm by compressed air applied to the front side of the diaphragm during operation of the vehicle. The emergency spring expands to actuate a brake setting push rod when the compressed air is vented from the front side of the diaphragm and this occurs when the vehicle engine is turned off or when there is an accidental loss of compressed air from the brake unit. The emergency spring is housed in a chamber and, due to the movement of the diaphragm, atmospheric air is continually being drawn into and expelled from that chamber. As the brake actuators are mounted on the rear axle of the vehicle, they are in low positions relative to the roadway and the air drawn into the emergency spring chambers thereof is laddened with salt and water. The emergency springs are thus subjected to corrosion which weakens them and ultimately causes them to break. A filter unit for air supplied to the brake actuators is on the chassis frame mounted behind the cab about three feet above the roadway. The filter unit is connected to the brake actuators with hoses.

2 Claims, 7 Drawing Figures

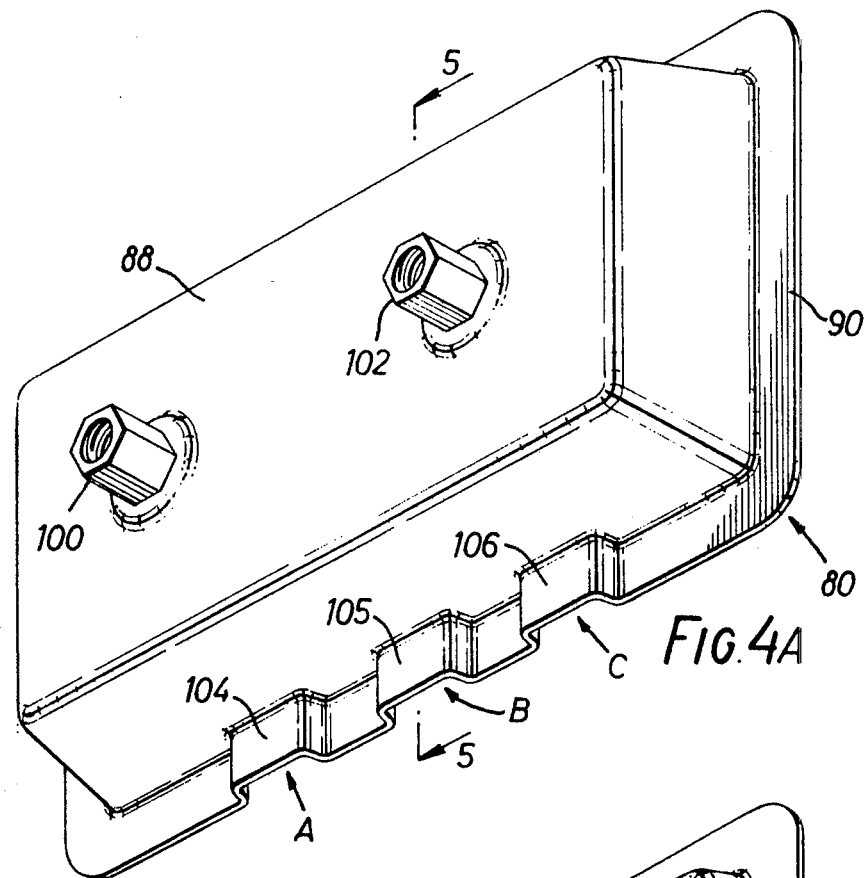
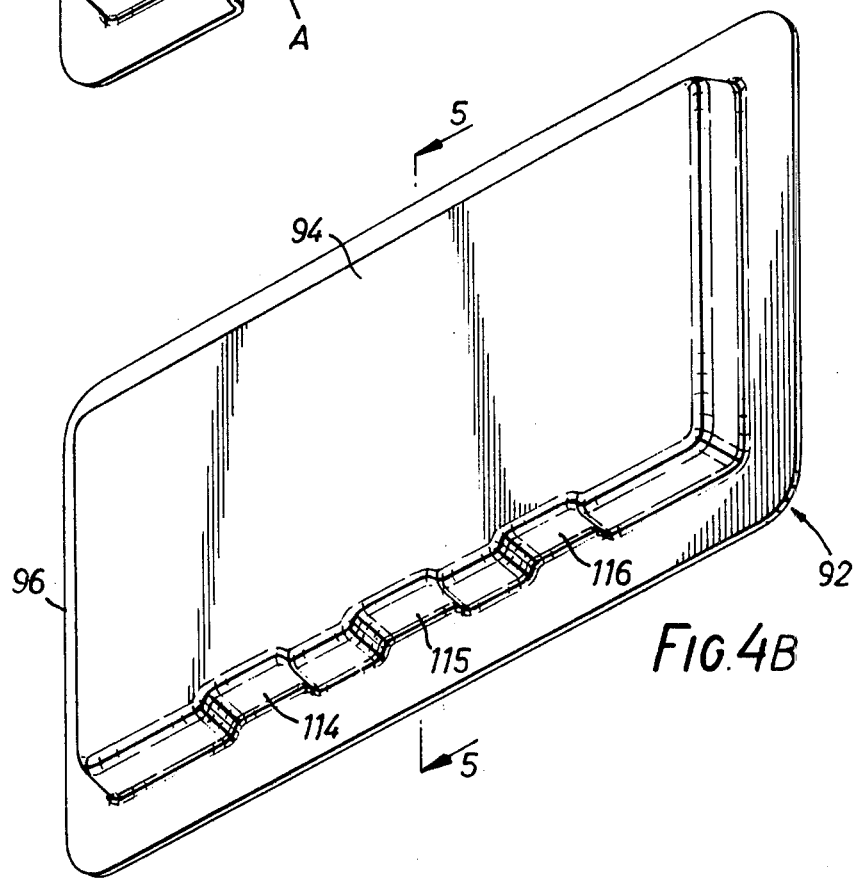

SPRING BRAKE ASSEMBLY

The invention relates to a new and improved spring brake assembly for truck tractor types of vehicles.

A spring brake assembly of the type to which the invention pertains includes a brake actuator of the compressed air type. The actuator includes a heavy coil type emergency spring which is held in a compressed state on the back side of a diaphragm by compressed air applied to the front side of the diaphragm during operation of the vehicle. The emergency spring expands to actuate a brake setting push rod when the compressed air is vented from the front side of the diaphragm and this occurs when the vehicle engine is turned off or when there is an accidental loss of compressed air from the brake unit.

The emergency spring is housed in a chamber and, due to the movement of the above referred to diaphragm, atmospheric air is continually being drawn into and expelled from that chamber. As the brake actuators are mounted on the rear axle of the vehicle, they are thus in low positions relative to the roadway. Being in these low positions the air drawn into the emergency spring chambers thereof is laddened with salt and water and the emergency springs are thus subjected to corrosion which weakens them and ultimately causes them to break.

It is a main object of the invention to provide a new and improved filter system for the spring brake assembly which provides cleaner and dried air for emergency spring chambers.

Other objects and advantages of the invention will become apparent from the following specification, drawings and appended claims.

In the drawings:

FIGS. 4A and 4B are elevational perspective views of the two outer parts of the filter unit shown in FIG. 1;

Figure 1:
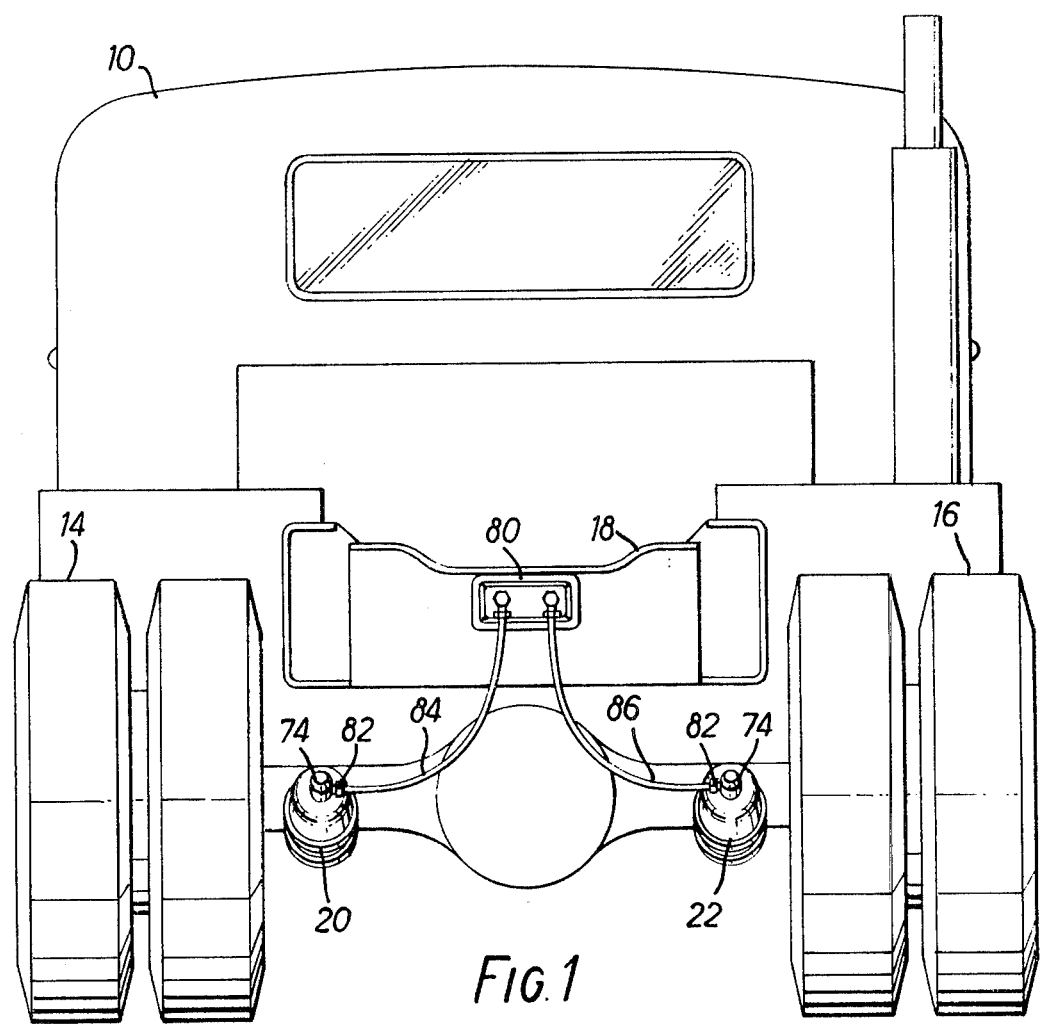
FIG. 1 is a rear view of a truck tractor showing a dual diaphragm type spring brake assembly embodying the invention.

Referring to the drawings, FIG. 1 is a rear view of a truck tractor. As far as is relevant herein, the tractor has a cab 10 and a chassis which includes a rear axle unit 12, multiple wheel units 14 and 16 and an upper frame section 18 immediately behind the cab 10.

Figure 2:
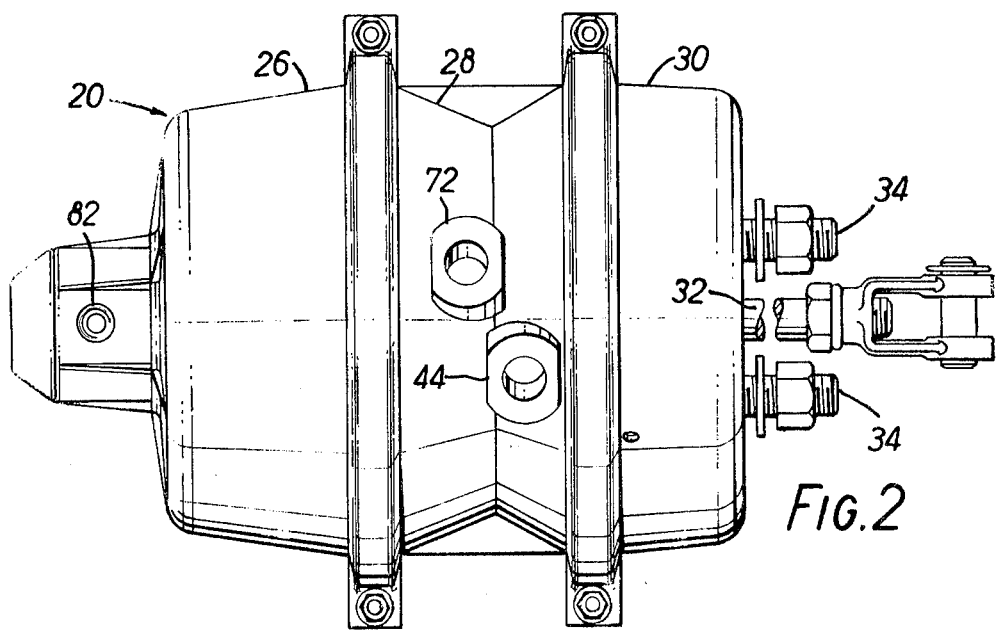
FIG. 2 is an enlarged side view of one of the two spring brake actuators shown in FIG. 1.
Figure 3:
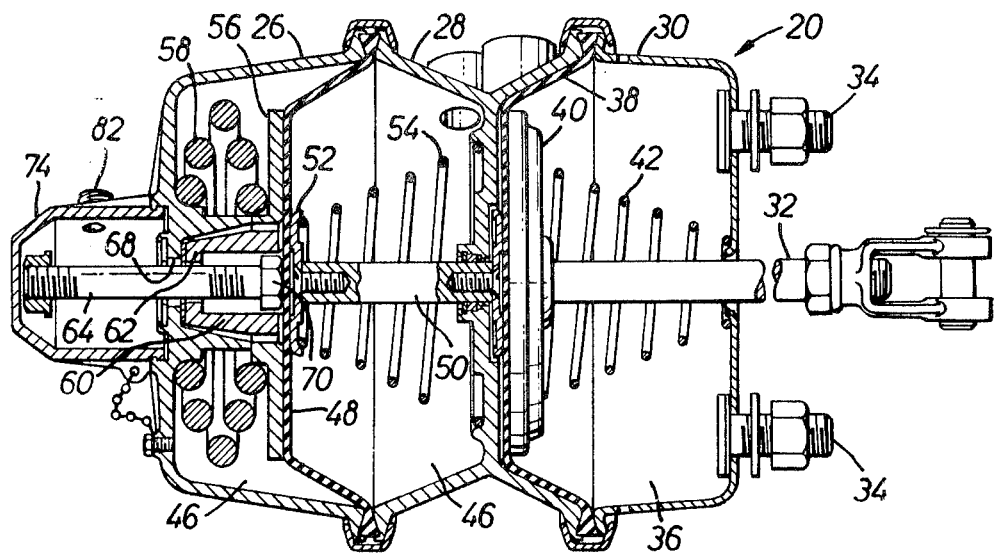
FIG. 3 is an enlarged longitudinal sectional view of a spring brake actuator of the type shown in FIGS. 1 and 2.

Spring brake actuators 20 and 22 are mounted on the axle unit 12 for operating the brake linkage (not shown) of the wheel units 14 and 16. Brake actuator 20 is shown in FIGS. 2 and 3 but the following description thereof applies equally to brake acutator 22 and its operation with respect to wheel unit 16.

Brake actuator 20 has an outer casing formed with three generally cylindrically shaped sections 26, 28 and 30 and a push rod 32. Rod 32 is attachable to brake linkage (not shown) of the wheel unit 14 and is axially movable to set the brakes when moved outwardly and to release the brakes when moved inwardly.

Brake actuator 20 has two mounting studs 34 for attaching the assembly to the axle unit 12. Casing sections 28 and 30 form a first chamber 36 in which is disposed a flexible diaphragm 38 to which push rod 32 is attached through a plate 40. A coil spring 42 biases diaphragm 38 and the push rod 32 leftwardly in the retraction direction.

A port 44 in casing section 28 has fluid communication with chamber 36 on the back side of diaphragm 38. When the foot brake pedal (not shown) is actuated, assuming the engine is running, compressed air directed through port 44 forces diaphragm 38 and rod 32 to the right, against the bias of spring 42, to effect an applying of the brakes. When port 44 is vented, as when the foot operated brake pedal is released, spring 42 effects movement of the rod 32 to the left to effect a releasing of the brakes.

Casing sections 26 and 28 form a second chamber 46 in which is disposed, and is divided by, a flexible diaphragm 48 to which a push rod 50 is attached through a plate 52. A coil spring 54 biases diaphargm 48 and rod 50 towards the left in the brake releasing direction. A retainer plate unit 56 on the back side of the diaphragm 48 facilitates the housing of an emergency spring 58 between the plate unit 56 and the casing section 26, the emergency spring being much stronger than return spring 54. Retainer unit 56 includes a sleeve portion 60 with a collar 62 at the left end thereof which defines a central hole. A release bolt 64 extends through a central hole 68 in casing section 26 and through the opening formed by the collar 62. Bolt 62 has a nut 70 fixedly welded to the right end thereof which engages the collar 62, for a reason to be explained, when the release bolt is moved outwardly to the left.

A port 72 in casing section 28 has fluid communication with chamber 46 on the front or right side of diaphragm 48. When the vehicle engine is running and the vehicle compressor unit is operating, compressed air directed through port 72 forces diaphragm 48 and rod 50 to the left, against the bias of emergency spring 58, so that rod 50 is in a dormant position and the normal braking operating is completely responsive and under the control of the pressure condition of chamber 36.

When the vehicle engine is not running, port 72 is vented to atmosphere by means not shown. Under those conditions there is no air pressure on the right side of chamber 46, or the right side of chamber 36, and emergency spring 58 is thereby permitted to overcome the bias of return spring 54 to move rod 50 to the right into pushing engagement with rod 32 which is also caused to move to the right to effect setting of the brakes.

Release bolt 64 is utilized when the compressor is not operable either because it has a malfunction or because the vehicle engine for driving the compressor is not operable. Under these conditions there is no air pressure in either of the chambers 36 or 46 and emergency spring 58 has expanded to set the brakes. The brakes can be manually released to facilitate moving the vehicle by moving release bolt 64 to the left so that the attached nut 70 engages sleeve collar 62 to move retainer unit 56 to the left and thereby compress emergency spring 58. The compressing of emergency spring 58 permits springs 54 and 42 to return rods 50 and 32, which are separate, to move to the left to their retracted positions and thus allow the brakes to be released.

A cap member 74 which may be made of a plastic material is attached with a snapping connection to end casing section 26. Cap 74 accommodates the presence of release bolt 64 and is detachably removable to permit access to release bolt 64. In the event that some other means would be provided for retracting the emergency spring, cap 74 would not be needed and the end of casing section 26 could be closed.

The left side of chamber 46 varies in volume due to the movement of diaphragm 48. Some kind of venting must be provided for the left side of chamber 46 to prevent erratic operation of the diaphragm 48 due to air binding. As the brake assemblies are only 6 to 8 inches off the ground, the venting of casing section 26 by providing holes therein would allow air laden with salt water to enter the left side of chamber 46 and cause corrosion and resulting breakage of the emergency spring 58.

A filter unit 80 mounted on the upper chassis frame section 18, about four feet above the ground and immediately behind the cab 10, serves to provide filtered, salt-free air for venting the left side of chamber 46.

For venting purposes cap 74 is provided with a threaded fitting 82 which constitutes a port 82 having fluid communication with the left side of chamber 46 which, except for port 82, is sealed relative to the environment externally of the casing sections 26, 28 and 30. Each of brake assemblies 20 and 22 has a cap 74 and, as seen in FIG. 1, two hoses 84 and 86 extend from these caps to the filter unit 80.

Filter unit 80 has a generally rectangular shape and includes a box shaped member 88 having a flange 90 and a cover-like member 92 which has the inner part 94 thereof embossed or raised to form a flange 96 which engages and cooperates with the flange 90.

Members 88 and 92 fit together as illustrated by the sealing of the flanges 90 and 94 to form an enclosed space or chamber 98. Box member 88 has two threaded fittings 100 and 102 to which hoses 84 and 86 are attached and which form ports 100 and 102 to provide fluid communication between the hoses and the chamber 98.

Box flange 90 has three spaced apart step portions 104, 105 and 106 which cooperate with three spaced apart respectively aligned recesses 114, 115 and 116 in the cover part 92 to form three ports A, B and C which provide fluid communication between the atmosphere and the chamber 98.

Disposed in the chamber 98 is a rectangularly shaped filter 120 made of sponge rubber which has a perimeter generally the same as the chamber 98 but the thickness thereof is only about one-half the width of chamber 98. Filter 120 is positioned against the rear wall of the chamber 98 in proximity to the ports 100 and 102. This arrangement provides an empty or open space 121 in the chamber 98 immediately above and in contact with the ports A, B and C.

The filter housing members 88 and 92 may be formed by injection molding or vacuum forming.

In the operation of the above described apparatus, the loss of pressure in chamber 46 due to the stopping of the compressor causes the automatic setting of the brakes. This occurs by reason of emergency spring 58 overcoming return spring 54 and causing the movement to the right of plate unit 56, diaphragm 48, plage 52, rod 50 and push rod 52. Release bolt 64 does not move because the sleeve 60 moves relative to the nut 70 attached to bolt 64. The expansion of the left side of chamber 46 draws are through filter ports A, B and C, the space 121 and the sponge rubber filter 120, through hose 84, fitting 82 of cap 74, casing hole 68 and into the left side of chamber 46. This air is clean and dry by reason of filter unit being well above the street level, the labyrinth passages provided by filter ports A, B and C and the actual filtering action of the sponge rubber.

When compressed air is admitted to chamber 46 on the right side of diaphragm 48 the diaphragm and spring 58 more to the left and forces air on the left side of the diaphragm out to the atmosphere through the hose 84 and ports A, B anrd C of filter unit 80. This reversed flow of air through the filter unit 80 has the effect of driving out moisture and dirt trapped in the sponge unit 120. The operation thus involves, in an alternating manner, the trapping of dirt and water which flows into the filter unit 80 and the freeing of such dirt and water by a reverse air flow from the pipes 84 and 86 to the filter unit 80.

Figure 5:
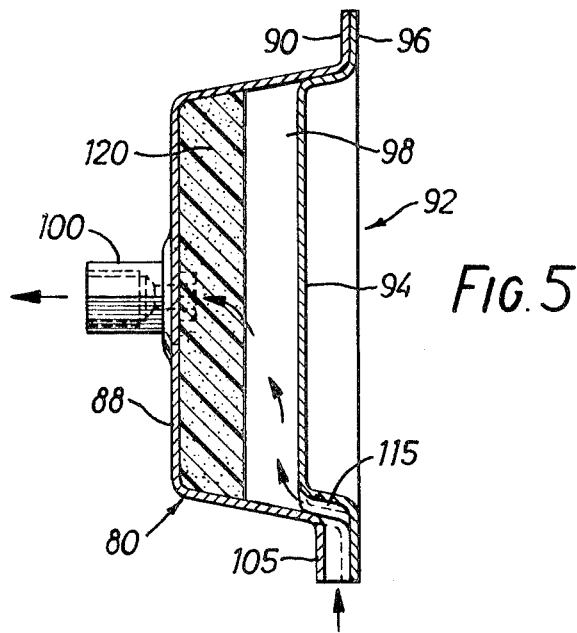
FIG. 5 is a vertical sectional view of the filter unit taken on line 5—5 of FIG. 4.
Figure 6:
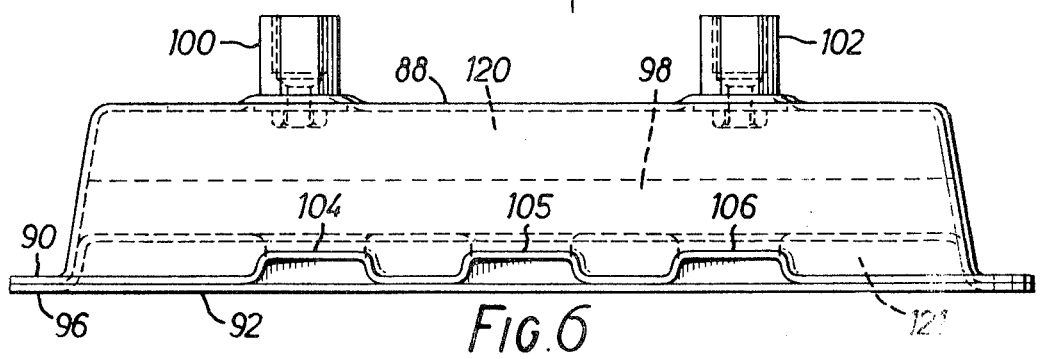
FIG. 6 is a bottom view of the filter unit shown in FIGS. 1, 4 and 5.

Ports A, B and C are constructed to facilitate the filtering action. Referring to port B in FIG. 5, the step portion 105 and the recess 115 which form the port B cause the path indicated by the broken line arrow to make three 90 degree turns in getting from port B to and through the fitting 100. This construction is a form of labyrinth which hinders or prevents the relatively heavy water in the air from following the air path and thus, after collecting on the inner walls of the filter unit, drains by gravity outwardly through the ports A, B and C.

I claim:

1. A spring brake assembly for a truck tractor of the type having a chassis and a cab, said spring brake assembly, comprising, a chassis frame portion disposed immediately behind said cab and a rear axle unit at the rear of said chassis, a spring brake actuator mounted on said rear axle, a filter unit mounted on said chassis frame portion and hose means connecting said actuator and said filter unit; said actuator including casing means defining a chamber, a flexible diaphragm dividing said chamber into first and second chamber sections, push rod means in said first chamber section engaging said diaphragm and being movable away therefrom in a brake applying direction and towards thereto in a brake releasing direction, return spring means biasing said diaphragm in a brake releasing direction, first port means through which said first chamber is alternately pressurized and depressurized, emergency spring means in said second chamber for moving said diaphragm and said push rod in a brake applying direction when said first chamber is depressurized, second port means through which air is admitted to and exhausted from said second chamber in accordance with the movement of said diaphragm; said filter unit comprising a rectangularly shaped box-member having front and rear spaced apart walls and being mounted on said chassis frame portion, fitting means on said rear facing wall, a sponge rubber filter in said filter unit adjacent said rear wall and spaced from said front wall to form a filter chamber, filter box port means at the lower part of said box member providing fluid communication between said filter chamber and the surrounding atmosphere; and hose means connecting said spring brake actuator second port means to said filter unit fitting means.

2. A spring brake assembly according to claim 1 wherein said filter unit comprises a box shaped part having a first flange and a cover part with the inner portion thereof raised to form a second surrounding flange which engages said first flange, said first flange having spaced apart step portions and said cover part having spaced apart recesses, said step portions and said recesses cooperating to form said filter box port means.

* * * * *

UNITED STATES PATENT OFFICE
CERTIFICATE OF CORRECTION

Patent No. 4,093,038             Dated    June 6, 1978

Inventor(s) Niel Leroy Molin

It is certified that error appears in the above-identified patent and that said Letters Patent are hereby corrected as shown below:

On the title page Item "(73) Assignee...." should be deleted.

Signed and Sealed this

Fourteenth Day of November 1978

[SEAL]

Attest:

RUTH C. MASON
Attesting Officer

DONALD W. BANNER
Commissioner of Patents and Trademarks